(12) United States Patent
Ajisaka

(10) Patent No.: US 11,285,998 B2
(45) Date of Patent: Mar. 29, 2022

(54) VEHICLE UNDERBODY STRUCTURE

(71) Applicant: TOYOTA JIDOSHA KABUSHIKI KAISHA, Aichi-ken (JP)

(72) Inventor: Satoshi Ajisaka, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 329 days.

(21) Appl. No.: 16/503,587

(22) Filed: Jul. 4, 2019

(65) Prior Publication Data

US 2020/0047808 A1 Feb. 13, 2020

(30) Foreign Application Priority Data

Aug. 9, 2018 (JP) .............................. JP2018-150691

(51) Int. Cl.
| | |
|---|---|
| *B60K 1/04* | (2019.01) |
| *B62D 21/02* | (2006.01) |
| *B62D 35/02* | (2006.01) |
| *B60K 15/07* | (2006.01) |
| *B60L 50/60* | (2019.01) |
| *B60L 50/64* | (2019.01) |
| *B62D 25/20* | (2006.01) |

(Continued)

(52) U.S. Cl.
CPC .............. *B62D 21/02* (2013.01); *B60K 1/04* (2013.01); *B60K 15/07* (2013.01); *B60L 50/64* (2019.02); *B60L 50/66* (2019.02); *B62D 21/157* (2013.01); *B62D 25/20* (2013.01); *B62D 35/02* (2013.01); *B60K 2001/0438* (2013.01); *B60K 2015/03118* (2013.01); *B60Y 2306/01* (2013.01)

(58) Field of Classification Search
CPC ...... B60K 1/04; B60K 15/063; B60K 15/067; B60K 2015/0634; B60K 2001/0422; B60K 2001/0427; B60K 2001/0433; B60K 2015/03118; B62D 21/02; B62D 25/20; B60L 50/66
See application file for complete search history.

(56) References Cited

U.S. PATENT DOCUMENTS 2,109,177 A * 2/1938 MacDonald ........... B62D 21/02
280/788
5,464,266 A * 11/1995 Guertler .................. B60R 19/42
293/109

(Continued)

FOREIGN PATENT DOCUMENTS

| JP | 2004345453 A | 12/2004 |
|---|---|---|
| JP | 2005153853 A | 6/2005 |

(Continued)

*Primary Examiner* — Frank B Vanaman
(74) *Attorney, Agent, or Firm* — Hauptman Ham, LLP

(57) ABSTRACT

A vehicle underbody structure includes a pair of rockers that are provided on both vehicle width direction sides of a vehicle underbody and extend in a vehicle front-rear direction, a battery that is disposed centrally in a vehicle width direction center between the pair of rockers and is disposed above a vehicle floor and on the lower side of a seat, a fuel tank that is disposed in the vehicle width direction center between the pair of rockers and is disposed under the vehicle floor and further toward a rear side of the vehicle than the battery, and a waste pipe that is coupled to a drive unit provided at a vehicle front side of the battery and extends in the vehicle front-rear direction between the battery and one of the rockers.

10 Claims, 6 Drawing Sheets

(51) Int. Cl.
  *B62D 21/15*   (2006.01)
  *B60K 15/03*   (2006.01)

(56) References Cited

U.S. PATENT DOCUMENTS

| | | | | |
|---|---|---|---|---|
| 5,726,551 | A * | 3/1998 | Miyazaki | B60L 53/57 |
| | | | | 320/124 |
| 7,051,825 | B2 * | 5/2006 | Masui | B60L 3/0046 |
| | | | | 180/68.5 |
| 7,568,592 | B2 * | 8/2009 | Miyauchi | B60K 15/077 |
| | | | | 220/4.14 |
| 10,668,821 | B2 * | 6/2020 | Fukazu | B60K 15/063 |
| 2007/0000702 | A1 | 1/2007 | Koshida et al. | |
| 2010/0297514 | A1 * | 11/2010 | Jufuku | H01M 8/2465 |
| | | | | 429/428 |
| 2011/0068622 | A1 * | 3/2011 | Ikeno | B60R 16/0215 |
| | | | | 307/10.1 |
| 2016/0114672 | A1 | 4/2016 | Kunii et al. | |
| 2017/0106744 | A1 | 4/2017 | Ajisaka | |
| 2017/0113731 | A1 | 4/2017 | Imura et al. | |
| 2017/0217296 | A1 * | 8/2017 | Nomura | B60R 19/02 |
| 2017/0237379 | A1 | 8/2017 | Fukazu et al. | |
| 2018/0072146 | A1 * | 3/2018 | Narisawa | B60K 1/04 |
| 2018/0175350 | A1 | 6/2018 | Goitsuka et al. | |

FOREIGN PATENT DOCUMENTS

| | | |
|---|---|---|
| JP | 2012183866 A | 9/2012 |
| JP | 2015-74406 A | 4/2015 |
| JP | 2016-83951 A | 5/2016 |
| JP | 2017-77781 A | 4/2017 |
| JP | 2017-81211 A | 5/2017 |
| JP | 2017-88009 A | 5/2017 |
| JP | 2017140991 A | 8/2017 |
| JP | 2017-206165 A | 11/2017 |
| JP | 201899911 A | 6/2018 |

* cited by examiner

VEHICLE UNDERBODY STRUCTURE

CROSS-REFERENCE TO RELATED APPLICATION

This application is based on and claims priority under 35 USC 119 from Japanese Patent Application No. 2018-150691 filed on Aug. 9, 2018, the disclosure of which is incorporated by reference herein.

BACKGROUND

Technical Field

The present disclosure relates to a vehicle underbody structure.

Related Art

Japanese Patent Application Laid-open (JP-A) No. 2017-081211 discloses a vehicle underbody structure where side sills (rockers) that extend along the vehicle front-rear direction are provided on both right and left sides of a vehicle underbody and where a hydrogen tank, a battery, and an exhaust gas pipe are disposed on the lower side of a floor panel that bridges the side sills.

However, in the related art described above, uneven portions are formed in the undersurface of the vehicle by vehicle body members mounted to the lower side of the floor panel and the air resistance of the vehicle underbody increases, whereby the aerodynamic performance of the vehicle is reduced.

Furthermore, when the height from the road surface to the vehicle undersurface is ensured, it becomes difficult to reduce the vehicle height.

SUMMARY

Thus, the present disclosure provides to obtain a vehicle underbody structure that can improve the aerodynamic performance of the underfloor and at the same time can reduce the vehicle height.

A vehicle underbody structure pertaining to a first aspect of the disclosure includes a pair of rockers that are provided at both vehicle width direction sides of a vehicle underbody and extend in a vehicle front-rear direction, a battery that is disposed centrally in a vehicle width direction between the pair of rockers and is disposed above a vehicle floor and at a lower side of a seat, a fuel tank that is disposed in the vehicle width direction center between the pair of rockers and is disposed under the vehicle floor and more in the vehicle rearward direction than the battery, and a waste pipe that is coupled to a drive unit provided at a vehicle front side of the battery and extends in the vehicle front-rear direction between the battery and one of the rockers.

In the vehicle underbody structure pertaining to the first aspect of the disclosure, the battery disposed in the vehicle width direction center between the pair of rockers is disposed above the vehicle floor and on the lower side of the seat. For this reason, compared to a case where the battery is disposed under the vehicle floor, uneven portions formed in the vehicle undersurface centered around the center of the vehicle underfloor are reduced. Moreover, the waste pipe coupled to the drive unit extends in the vehicle front-rear direction between the battery and one of the rockers, so compared to a structure where the waste pipe is disposed along the vehicle front-rear direction in the center of the vehicle underfloor, uneven portions formed in the center of the vehicle underfloor can be further reduced. Because of this, the aerodynamic performance of the underfloor is improved.

Furthermore, the structure of the vehicle underfloor can be thinned in the vehicle up and down direction in correspondence to the battery being disposed above the vehicle floor and on the lower side of the seat, so even if the height from the road surface to the vehicle undersurface is ensured, the vehicle height can be reduced.

A vehicle underbody structure pertaining to a second aspect of the disclosure is the vehicle underbody structure of the first aspect, wherein the battery and the fuel tank are disposed at positions that overlap with the rockers as seen in a vehicle side view.

In the vehicle underbody structure pertaining to the second aspect of the disclosure, the battery and the fuel tank are disposed at positions that overlap with the rockers as seen in a vehicle side view. For this reason, for example, compared to a configuration where the battery and the fuel tank are disposed on the lower side of the rockers as seen in a vehicle side view, the formation of dead space is inhibited. Furthermore, height differences in the installation positions of the battery and the fuel tank can be inhibited, so the formation of uneven portions can be reduced in a wide range of the vehicle undersurface centered around the center of the vehicle underfloor. Because of this, the aerodynamic performance of the underfloor is further improved.

A vehicle underbody structure pertaining to a third aspect of the disclosure is the vehicle underbody structure of the first aspect or the second aspect, further including a pair of first frame members that are respectively disposed between one or another of the pair of rockers and the battery and extend in the vehicle front-rear direction and second frame members that couple the first frame members to each other in the vehicle width direction and are respectively disposed at least between the battery and the drive unit and between the battery and the fuel tank as seen in a vehicle plan view.

In the vehicle underbody structure pertaining to the third aspect of the disclosure, the four sides of the battery are surrounded by frame members as seen in a vehicle plan view by the pair of first frame members that extend in the vehicle front-rear direction and the second frame members that couple the first frame members to each other in the vehicle width direction. Because of this, the battery can be protected from the load input to the vehicle body at the time of an impact to the vehicle.

A vehicle underbody structure pertaining to a fourth aspect of the disclosure is the vehicle underbody structure of any one of the first aspect to the third aspect, wherein the battery is disposed at a lower side of at least one of a driver's seat or a front passenger seat.

In the vehicle underbody structure pertaining to the fourth aspect of the disclosure, the battery is disposed at a lower side of at least one of the driver's seat or a front passenger seat, whereby the battery is disposed on the front side of the vehicle. Because of this, space for mounting the fuel tank under the rear seat or the luggage compartment on the vehicle rear side can be ensured, so the tank capacity can be sufficiently ensured.

A vehicle underbody structure pertaining to a fifth aspect of the disclosure is the vehicle underbody structure of any one of the first aspect to the fourth aspect, wherein the drive unit is configured to include an inverter, and the inverter and the battery are coupled to each other by a high-voltage cable.

In the vehicle underbody structure pertaining to the fifth aspect of the disclosure, the drive unit is provided on the vehicle front side of the battery, and the inverter and the battery that configure the drive unit are coupled to each other by the high-voltage cable. For this reason, compared to a structure where vehicle-mounted members such as the fuel tank are disposed between the drive unit and the battery, the distance between the battery and the inverter is short and the length of the high-voltage cable can be shortened. As a result, current loss between the battery and the inverter is inhibited.

A vehicle underbody structure pertaining to a sixth aspect of the disclosure is the vehicle underbody structure of any one of the first aspect to the fifth aspect, wherein the fuel tank is a gasoline tank, the drive unit is configured to include a gasoline engine, and the waste pipe is an exhaust gas pipe that discharges, to outside of the vehicle, exhaust gas from the gasoline engine.

In the vehicle underbody structure pertaining to the sixth aspect of the disclosure, uneven portions formed in the center of the vehicle undersurface are reduced and the vehicle underbody structure is thinned in the vehicle up and down direction in a hybrid vehicle where the gasoline tank and the battery are mounted to the vehicle underbody. Because of this, the aerodynamic performance of the underfloor of the hybrid vehicle can be improved and at the same time the vehicle height can be reduced.

A vehicle underbody structure pertaining to a seventh aspect of the disclosure is the vehicle underbody structure of any one of the first aspect to the fifth aspect, wherein the fuel tank is a hydrogen tank, the drive unit is configured to include a fuel cell stack, and the waste pipe is a water discharge pipe that discharges, to outside of the vehicle, waste water from the fuel cell stack.

In the vehicle underbody structure pertaining to the seventh aspect of the disclosure, uneven portions formed in the center of the vehicle undersurface are reduced and the vehicle underbody structure is thinned in the vehicle up and down direction in a fuel cell vehicle where the hydrogen tank and the battery are mounted to the vehicle underbody. Because of this, the aerodynamic performance of the underfloor of the fuel cell vehicle can be improved and at the same time the vehicle height can be reduced.

According to the vehicle underbody structure of the first aspect of the disclosure, the vehicle underbody structure has the superior effect that the aerodynamic performance of the underfloor can be improved and at the same time the vehicle height can be reduced.

According to the vehicle underbody structure of the second aspect of the disclosure, the vehicle underbody structure has the superior effect that the formation of uneven portions can be reduced in a wide range of the vehicle undersurface and the aerodynamic performance of the underfloor can be further improved.

According to the vehicle underbody structure of the third aspect of the disclosure, the vehicle underbody structure has the superior effect that the battery can be protected from the load input to the vehicle body at the time of an impact to the vehicle.

According to the vehicle underbody structure of the fourth aspect of the disclosure, the vehicle underbody structure has the superior effect that space for mounting the fuel tank under the rear seat or the luggage compartment on the vehicle rear side can be ensured and the tank capacity can be sufficiently ensured.

According to the vehicle underbody structure of the fifth aspect of the disclosure, the vehicle underbody structure has the superior effect that the length of the high-voltage cable can be shortened and current loss between the battery and the inverter can be inhibited because the distance between the battery and the inverter is short.

According to the vehicle underbody structure of the sixth aspect of the disclosure, the vehicle underbody structure has the superior effect that the aerodynamic performance of the underfloor of a hybrid vehicle can be improved and at the same time the vehicle height can be reduced.

According to the vehicle underbody structure of the seventh aspect of the disclosure, the vehicle underbody structure has the superior effect that the aerodynamic performance of the underfloor of a fuel cell vehicle can be improved and at the same time the vehicle height can be reduced.

BRIEF DESCRIPTION OF THE DRAWINGS

Exemplary embodiments of the present disclosure will be described in detail based on the following figures, wherein.

DETAILED DESCRIPTION

First Embodiment

Figure 1:
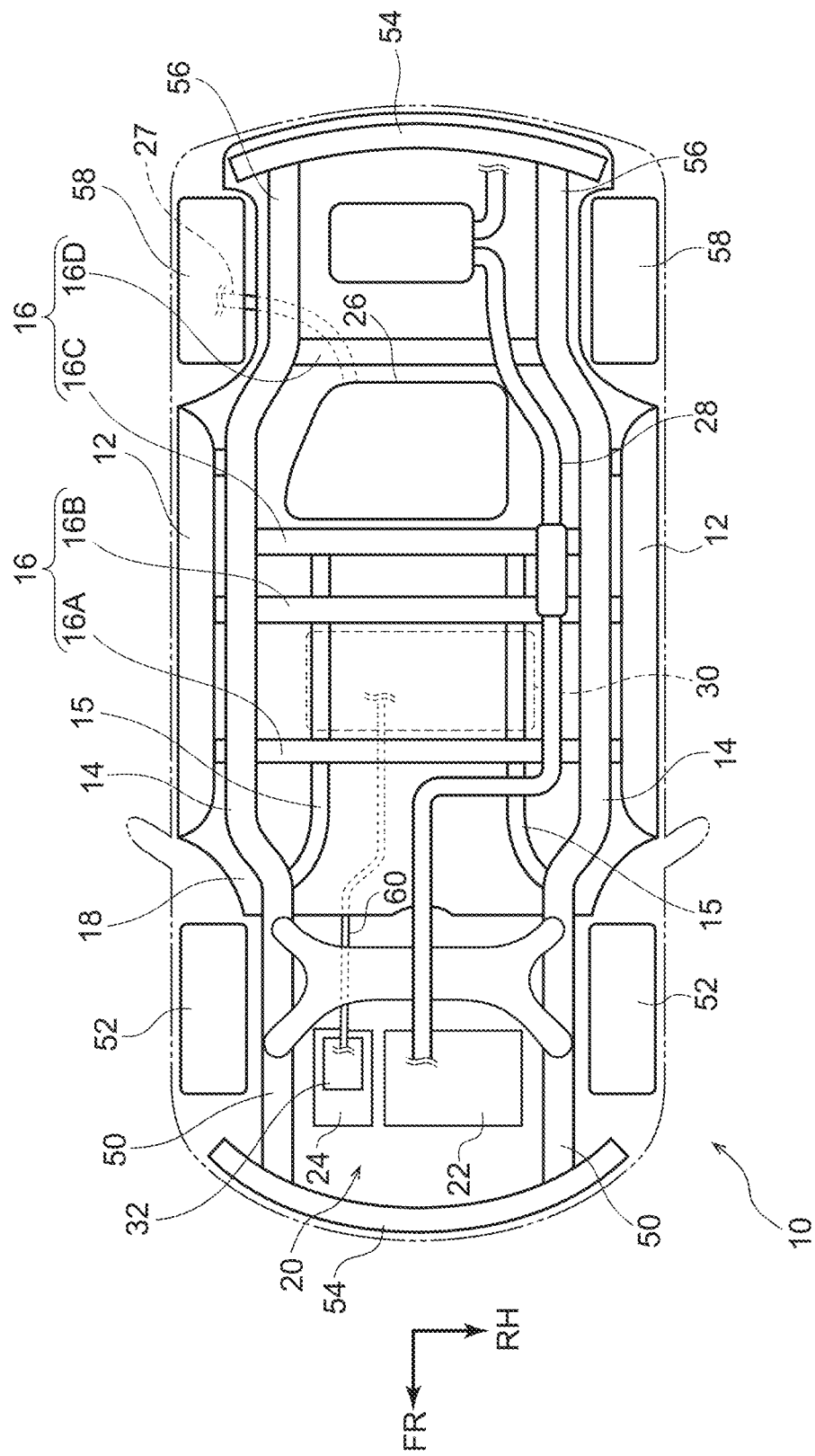
FIG. 1 is a schematic bottom view schematically showing a vehicle equipped with a vehicle underbody structure pertaining to a first embodiment as seen from below.

A first embodiment of a vehicle underbody structure pertaining to the disclosure will be described below on the basis of FIG. 1 to FIG. 4. It will be noted that, for convenience of description, arrow UP appropriately shown in the drawings indicates a vehicle body upward direction, arrow FR indicates a vehicle body forward direction, and arrow RH indicates a rightward direction in the vehicle width direction. Furthermore, when the directions of upper/lower, front/rear, and right/left are used with further specification in the following description, these will be understood to mean upper/lower in the vehicle body up and down direction, front/rear in the vehicle body front-rear direction, and right/left in the vehicle body right and left direction (the vehicle width direction). Furthermore, there are cases where some reference signs are omitted in the drawings to make it easier to see what is shown in the drawings.

FIG. 1 is a bottom view showing a vehicle underbody of a vehicle 10 equipped with the vehicle underbody structure pertaining to the present embodiment. As shown in this drawing, the vehicle 10 has, on the vehicle underbody, a right and left pair of rockers 12, a right and left pair of side frames 14, and plural (in the present embodiment, four) cross members 16, all of which serve as frame members. Furthermore, a floor panel 18 is disposed on the vehicle upper side of the frame members.

Furthermore, the vehicle 10 is a hybrid vehicle and has two drive sources, a gasoline engine 22 and a traveling motor 24, in a drive unit 20 provided in the vehicle front portion. The gasoline engine 22 is an internal combustion engine that uses gasoline retained in a gasoline tank 26 as fuel, and exhaust gas generated by the gasoline engine 22 is exhausted through an exhaust gas pipe 28 to the outside of the vehicle. Furthermore, the traveling motor 24 is driven when it receives a supply of electric power from a battery 30 via an inverter 32 in the drive unit 20.

Each of the constituent elements will be described in detail below. It will be noted that the side frames 14 correspond to "first frame members" of the disclosure and that the cross members 16 correspond to "second frame members" of the disclosure. Furthermore, the floor panel 18 corresponds to a "floor" of the vehicle of the disclosure, the vehicle lower side of the floor panel 18 means "under the vehicle floor," and the vehicle upper side of the floor panel 18 means "above the vehicle floor." Furthermore, the exhaust gas pipe 28 corresponds to a "waste pipe" of the disclosure.

Figure 2:
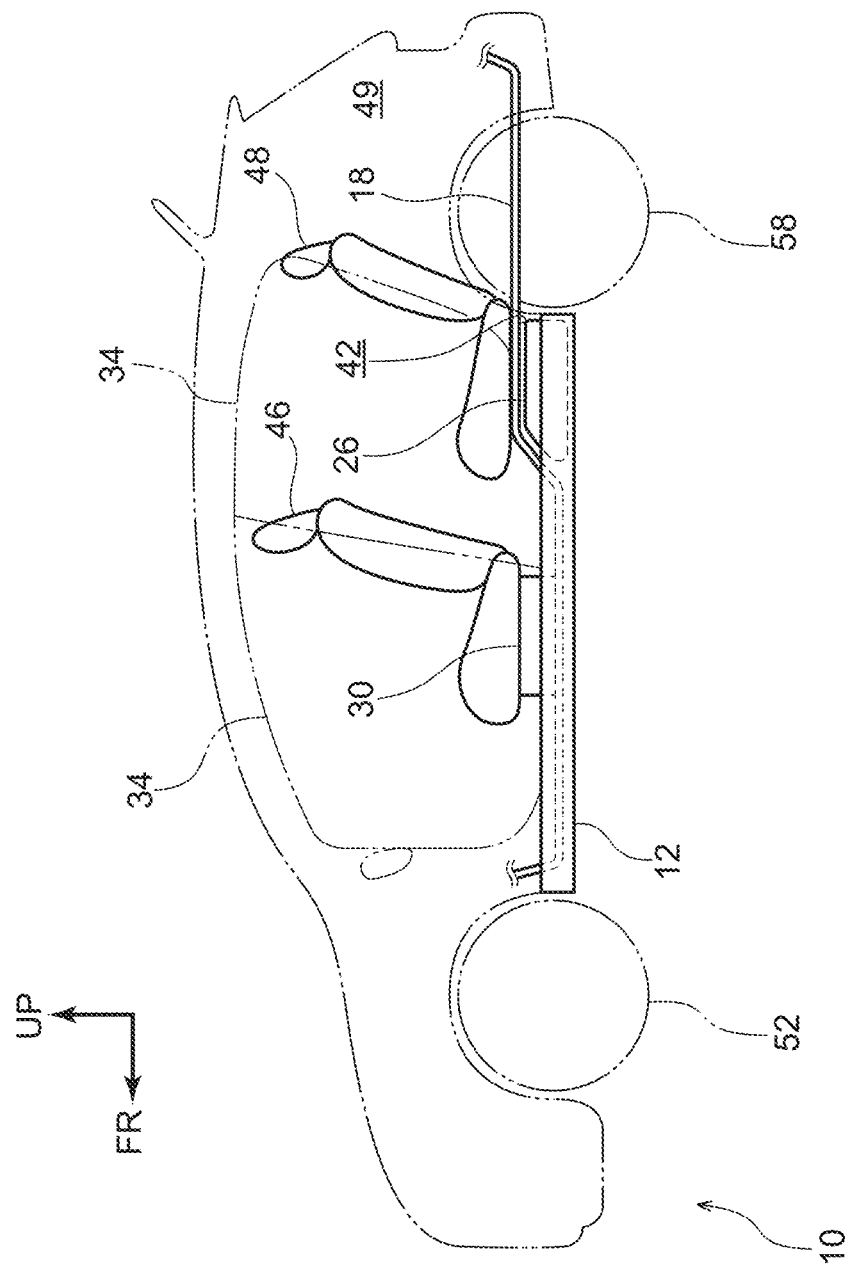
FIG. 2 is a schematic side view schematically showing the vehicle shown in FIG. 1 as seen from the side.
Figure 3:
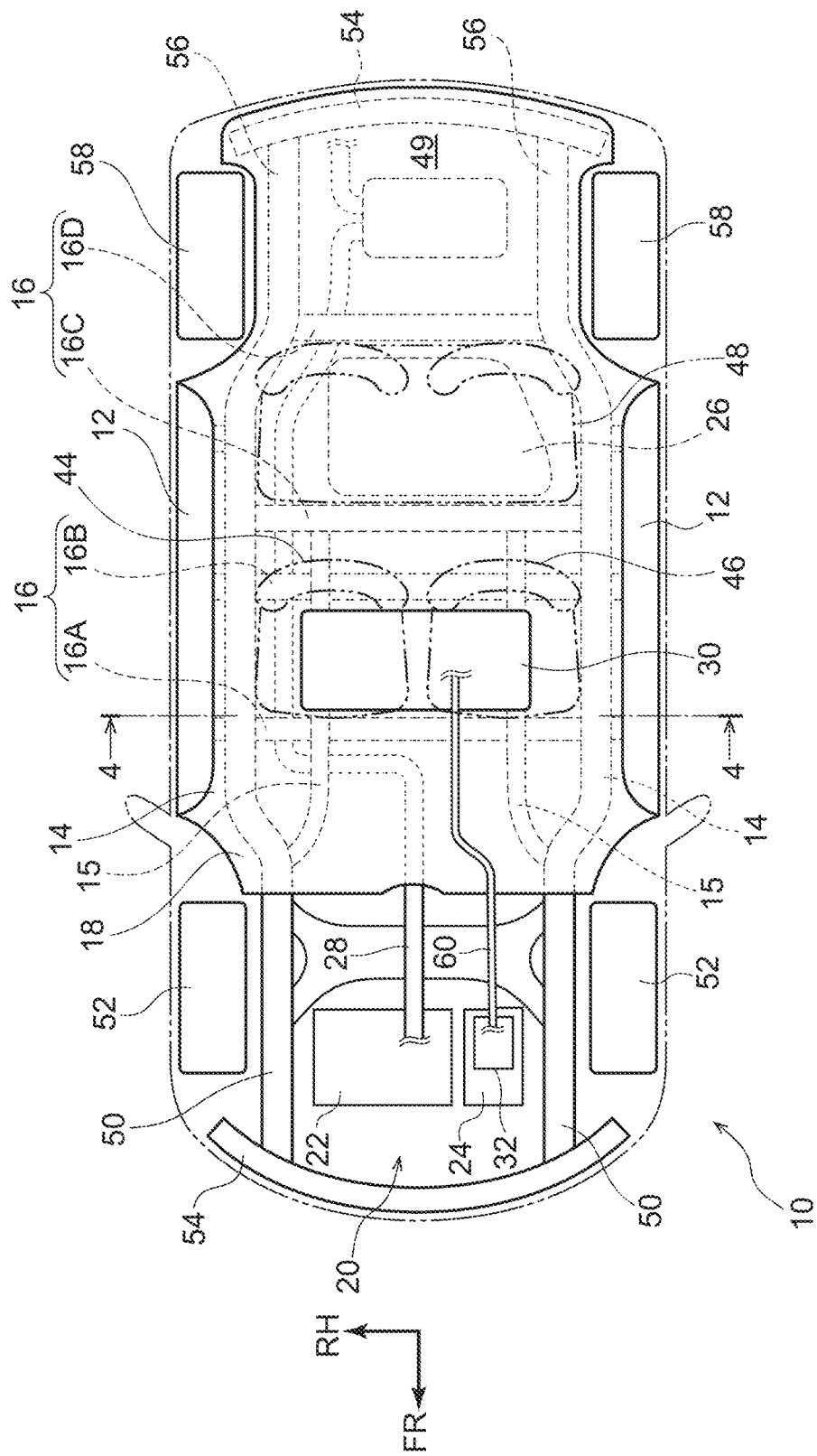
FIG. 3 is a schematic plan view schematically showing the vehicle shown in FIG. 1 as seen from above.

As shown in FIG. 1 to FIG. 3, the rockers 12 are frame members that are provided as a right and left pair on both vehicle width direction sides of the vehicle underbody of the vehicle 10 and extend in the vehicle front-rear direction. The rockers 12 are disposed on the lower sides of side doors 34 of the vehicle 10 and configure doorsill portions between the vehicle interior and the vehicle exterior. It will be noted that, for convenience of description, illustration of an inlet pipe 27 is omitted in FIG. 2 and FIG. 3.

Figure 4:
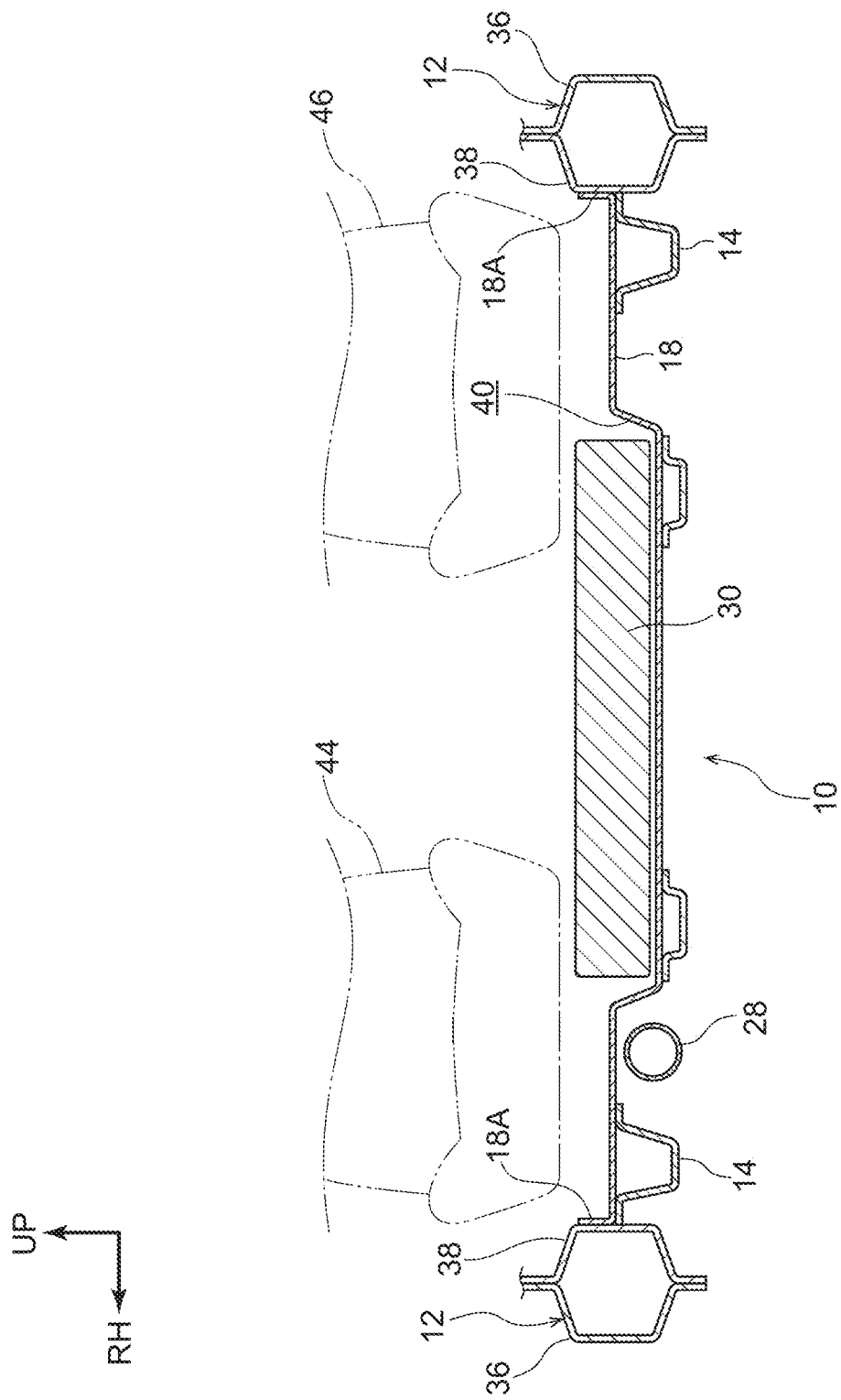
FIG. 4 is a sectional view of the vehicle cut along line 4-4 of FIG. 3.

As shown in FIG. 4, each rocker 12 is formed in the shape of a hollow tube and has a rocker outer member 36 disposed on the vehicle width direction outer side and a rocker inner member 38 disposed on the vehicle width direction inner side. The cross section of the rocker outer member 36 perpendicular to the direction in which the rocker outer member 36 extends is formed in the shape of a hat that opens inward in the vehicle width direction and becomes convex outward in the vehicle width direction. The cross section of the rocker inner member 38 perpendicular to the direction in which the rocker inner member 38 extends is formed in the shape of a hat that opens outward in the vehicle width direction and becomes convex inward in the vehicle width direction. The rocker outer member 36 and the rocker inner member 38 are joined to each other at their respective upper end portions and lower end portions to form a closed cross section.

The floor panel 18 is formed substantially in the shape of a rectangular plate as seen in a plan view, and vehicle width direction outer end portions 18A of the floor panel 18 are joined to the rocker inner members 38 of the right and left pair of rockers 12. Because of this, the floor panel 18 bridges the pair of rockers 12.

Furthermore, a substantially rectangular recess portion whose longitudinal direction coincides with the vehicle width direction is formed in the center of the front portion of the floor panel 18, and the recess portion is configured to serve as a placement portion 40 for the battery 30, which is disposed on top of the floor panel 18. The placement portion 40 is provided on the inner side of the later-described right and left pair of side frames 14 as seen in a plan view. Furthermore, the middle portion of the floor panel 18 bulges convexly upward in the vehicle upward direction between the right and left rockers 12, thereby forming a space portion 42 on the lower side of the floor panel 18. The space portion 42 serves as a space for mounting the gasoline tank 26. That is, the battery 30 and the gasoline tank 26 are disposed in such a way as to overlap (coincide with) the rockers 12 as seen from the side in the vehicle width direction.

As shown in FIG. 3, a driver's seat 44 and a front passenger seat 46 are provided side by side in the vehicle width direction on the upper side of the placement portion 40 of the floor panel 18. Furthermore, a rear seat 48 is provided on the upper side of the space portion 42. Additionally, a luggage compartment 49 of the vehicle 10 is provided on the upper side of the rear portion of the floor panel 18.

The right and left pair of side frames 14 are provided on the undersurface of the floor panel 18 on both vehicle width direction sides. The side frames 14 are frame members that extend in the vehicle front-rear direction. The side frames 14 are disposed on the vehicle width direction inner sides of the right and left pair of rockers 12. The cross section of each side frame 14 perpendicular to the direction in which the side frame 14 extends is formed in the shape of a hat that opens in the vehicle upward direction and becomes convex in the vehicle downward direction. Additionally, both vehicle width direction right and left end portions of each side frame 14 are joined to the undersurface of the floor panel 18.

Furthermore, plural cross members 16 that couple the pair of side frames 14 to each other in the vehicle width direction are provided between the right and left pair of side frames 14. In the present embodiment, four cross members 16 bridge the right and left side frames 14, so that a first member 16A, a second member 16B, a third member 16C, and a fourth member 16D are disposed in this order from the vehicle front side. The first member 16A to the fourth member 16D are each configured as a frame member whose cross section perpendicular to the direction in which the member extends is formed in a closed cross-sectional rectangular shape, and the first member 16A to the fourth member 16D bridge the pair of side frames 14 at intervals apart from each other in the vehicle front-rear direction. Because of this, a frame that is ladder-shaped as seen in a plan view is formed by the side frames 14 and the cross members 16.

Furthermore, a right and left pair of inner side frames 15 that extend substantially parallel to the side frames 14 are provided on the vehicle width direction inner sides of the pair of side frames 14. The inner side frames 15 branch inward in the vehicle width direction from the front end portions of the side frames 14 and extend in the vehicle rearward direction, and the rear end portions of the inner side frames 15 are coupled to the third member 16C.

Furthermore, a right and left pair of front side members 50 are coupled to the front end portions of the side frames 14. The front side members 50 extend in the vehicle front-rear direction, are disposed on the inner sides of a right and left pair of front wheels 52, and configure frame members of the vehicle front portion. A bumper reinforcement 54 bridges the front end portions of the pair of front side members 50. A right and left pair of rear side members 56 are coupled to the rear end portions of the side frames 14. The rear side members 56 extend in the vehicle front-rear direction, are disposed on the inner sides of a right and left pair of rear wheels 58, and configure frame members of the vehicle rear portion. Additionally, a bumper reinforcement 54 bridges the rear end portions of the pair of rear side members 56. It will be noted that, as shown in FIG. 1, the side frames 14 are offset outward in the vehicle width direction from the front side members 50 and the rear side members 56 as seen in a plan view.

As shown in FIG. 1 to FIG. 4, the battery 30 and the gasoline tank 26 are both disposed in the vehicle width direction center and are arranged in this order from the vehicle front side. Furthermore, the battery 30 and the gasoline tank 26 are disposed more inward in the vehicle width direction than the right and left pair of side frames 14.

The battery 30 is formed substantially in the shape of a rectangle whose vehicle width direction sides are longer than its vehicle body front-rear direction sides as seen in a plan view, and the battery 30 has numerous battery cells (not shown in the drawings) inside. As mentioned above, the battery 30 is accommodated in the placement portion 40 provided in the front portion and upper surface of the floor panel 18. The battery 30 is secured via the floor panel 18 to the inner side frames 15, which are disposed in such a way as to coincide with the placement portion 40 as seen in a plan view. Because of this, the battery 30 is disposed on the upper side of the floor panel 18 and on the lower side of the driver's seat 44 and the front passenger seat 46. Furthermore, the battery 30 is disposed in such a way as to coincide with the rockers 12 as seen in a vehicle side view.

Moreover, in this state, the battery 30 is disposed between the first member 16A and the second member 16B that configure the cross members 16 as seen in a plan view. Because of this, the four sides of the battery 30 are surrounded by the pair of side frames 14, the first member 16A, and the second member 16B as seen in a plan view.

The gasoline tank 26 is formed substantially in the shape of a trapezoid whose vehicle width direction sides are longer than its vehicle body front-rear direction sides as seen in a plan view, and the gasoline tank 26 can store gasoline inside. As mentioned above, the gasoline tank 26 is accommodated in the space portion 42 provided on the lower side of the middle portion of the floor panel 18 and is disposed in such a way as to coincide with the rockers 12 as seen in a vehicle side view. Furthermore, the third member 16C and the fourth member 16D that configure the cross members 16 are disposed in this order from the vehicle front side on both vehicle front-rear direction sides of the gasoline tank 26. Because of this, the four sides of the gasoline tank 26 are surrounded by the pair of side frames 14, the third member 16C, and the fourth member 16D as seen in a plan view. Furthermore, the gasoline tank 26 is secured to the third member 16C and the fourth member 16D via tank belts not shown in the drawings. Because of this, the gasoline tank 26 is supported by the frame members of the vehicle body. It will be noted that the rear end of the gasoline tank 26 is communicated, via an inlet pipe 27, with a fuel fill inlet (not shown in the drawings) provided in the right side portion of the vehicle rear portion, so that gasoline can be supplied to the inside of the tank via this fuel fill inlet.

The drive unit 20 is provided on the front side of the battery 30 on the vehicle width direction inner sides of the right and left pair of front side members 50. The drive unit 20 is configured to include the gasoline tank 26, the traveling motor 24, and the inverter 32. As mentioned above, the battery 30 and the traveling motor 24 are connected to each other via the inverter 32. Furthermore, the battery 30 and the inverter 32 are coupled to each other by a high-voltage cable 60. By disposing the battery 30 on the rear side of the drive unit 20 in this way, the high-voltage cable 60 interconnecting the battery 30 and the inverter 32 can be shortened.

Furthermore, the gasoline engine 22 that configures the drive unit 20 is connected to the exhaust gas pipe 28 via a manifold not shown in the drawings. The exhaust gas pipe 28 comprises a cylindrical pipe and has the function of exhausting, to the outside of the vehicle, exhaust gas exhausted from the gasoline engine 22 that is an internal combustion engine.

The exhaust gas pipe 28 is disposed on the lower side of the floor panel 18 and extends from the drive unit 20 to the rear end of the vehicle 10. Specifically, the part of the exhaust gas pipe 28 from its front end portion to its middle portion is disposed in such a way as to extend along the vehicle front-rear direction from the drive unit 20, bend outward in the vehicle width direction on the front side of the battery 30, and cross in front of the battery 30 as seen in a plan view. Then, the exhaust gas pipe 28 extends in the vehicle rearward direction along the vehicle width direction right side of the battery 30 and the gasoline tank 26. In this way, the exhaust gas pipe 28 is disposed in avoidance of the vehicle width direction center of the undersurface of the floor panel 18, so uneven portions resulting from the exhaust gas pipe 28 are not formed in the vehicle width direction center of the undersurface of the floor panel 18.

Furthermore, the exhaust gas pipe 28 is disposed between the battery 30 and the gasoline tank 26 on one side and the side frame 14 on the other on the vehicle width direction right side of the battery 30 and the gasoline tank 26. Consequently, if an impact load is input to the right side portion of the vehicle 10, the load is transmitted to the side frame 14 as the rocker 12 becomes deformed inward in the vehicle width direction. Because of this, the battery 30, the gasoline tank 26, and the exhaust gas pipe 28 that are disposed on the vehicle width direction inner side of the side frames 14 are protected from the impact load. It will be noted that the exhaust gas pipe 28 may also be disposed between the rocker 12 and the side frame 14 on the vehicle width direction right side of the battery 30 and the gasoline tank 26. Furthermore, the exhaust gas pipe 28 may also be disposed on the vehicle width direction left side of the battery 30 and the gasoline tank 26.

(Action and Effects)

Next, the action and effects of the vehicle underbody structure pertaining to the present embodiment will be described.

In the vehicle 10 to which the vehicle underbody structure pertaining to the present embodiment has been applied, the battery 30 is disposed in the vehicle width direction center between the pair of rockers 12. The battery 30 is disposed on the vehicle upper side of the floor panel 18 and on the lower side of the driver's seat 44 and the front passenger seat 46. For this reason, compared to a case where the battery 30 is disposed on the vehicle lower side of the floor panel 18, uneven portions formed in the center of the lower side of the floor panel 18 are reduced. Moreover, the exhaust gas pipe 28 coupled to the drive unit 20 extends in the vehicle front-rear direction between the battery 30 and the rockers 12. For this reason, for example, compared to a structure where the exhaust gas pipe is disposed on the lower side of the floor panel 18 and along the vehicle front-rear direction in the vehicle width direction center, uneven portions formed in the center of the lower side of the floor panel 18 can be further reduced. Because of this, the aerodynamic performance of the underfloor can be improved.

Furthermore, the structure of the lower side of the floor panel 18 can be thinned in the vehicle up and down direction in correspondence to the battery 30 being disposed on the vehicle upper side of the floor panel 18 and on the lower side of the driver's seat 44 and the front passenger seat 46. For this reason, even if the height from the road surface to the vehicle undersurface is ensured, the vehicle height can be reduced.

Furthermore, in the present embodiment, the battery 30 and the gasoline tank 26 are disposed in such a way as to coincide with the rockers 12 as seen in a vehicle side view. For this reason, for example, compared to a configuration where the battery 30 and the gasoline tank 26 are disposed on the lower side of the rockers 12 as seen in a vehicle side view, the formation of dead space is inhibited. Furthermore, height differences in the installation positions of the battery 30 and the gasoline tank 26 can be inhibited, so the formation of uneven portions can be reduced in a wide range of the vehicle undersurface centered around the center of the lower side of the floor panel 18. Because of this, the aerodynamic performance of the underfloor is further improved.

Furthermore, in the present embodiment, the four sides of the battery 30 are surrounded by frame members as seen in a vehicle plan view by the pair of side frames 14 that extend in the vehicle front-rear direction and the first member 16A and the second member 16B that couple the side frames 14 to each other in the vehicle width direction. Because of this, the battery 30 can be protected from the load input to the vehicle body at the time of an impact to the vehicle.

Furthermore, in the present embodiment, the battery 30 is disposed on the lower side of the driver's seat 44 and the front passenger seat 46, whereby the battery 30 is disposed on the front side of the vehicle 10. Because of this, space for mounting the gasoline tank 26 on the lower side of the rear seat 48 or the luggage compartment 49 on the vehicle rear side can be ensured, so the tank capacity can be sufficiently ensured.

Furthermore, in the present embodiment, the drive unit 20 is provided on the vehicle front side of the battery 30, and the inverter 32 and the battery 30 that configure the drive unit 20 are coupled to each other by the high-voltage cable 60. For this reason, compared to a structure where the gasoline tank 26 is disposed between the drive unit 20 and the battery 30, the distance between the battery 30 and the inverter 32 is short and the length of the high-voltage cable 60 can be shortened. As a result, current loss between the battery 30 and the inverter 32 is inhibited.

In this way, in the present embodiment, the aerodynamic performance of the underfloor of the hybrid vehicle can be improved and at the same time the vehicle height can be reduced.

Moreover, in the present embodiment, the four sides of the gasoline tank 26 are surrounded by frame members as seen in a plan view by the pair of side frames 14 that extend in the vehicle front-rear direction and the third member 16C and the fourth member 16D that couple the side frames 14 to each other in the vehicle width direction. Because of this, the gasoline tank 26 can be protected from the load input to the vehicle body at the time of an impact to the vehicle.

Furthermore, in the present embodiment, the side frames 14 are offset outward in the vehicle width direction from the front side members 50 and the rear side members 56 as seen in a plan view. For this reason, in the center of the vehicle underbody the space on the inner side of the pair of side frames 14 is enlarged, resulting in enlarged capacities for the battery 30 and the gasoline tank 26 and an enhancement in design flexibility.

Furthermore, the distance between the rockers 12 and the side frames 14 is shortened in correspondence to the side frames 14 being offset outward in the vehicle width direction. For this reason, at the time of a side impact to the vehicle, the load input to the rockers 12 is transmitted at an early stage to the side frames 14 and is transmitted from the side frames 14 to the cross members 16. Because of this, at the time of a side impact to the vehicle, intrusion of the impactor into the cabin space can be inhibited at an early stage.

Furthermore, in the present embodiment, the exhaust gas pipe 28 is disposed more inward in the vehicle width direction than the side frames 14, so the exhaust gas pipe 28 can be protected by the side frames 14 at the time of a side impact to the vehicle.

Furthermore, in the present embodiment, the battery 30 is disposed on the vehicle upper side of the floor panel 18, and the exhaust gas pipe 28 is disposed on the vehicle lower side of the floor panel 18. Furthermore, the battery 30 and the exhaust gas pipe 28 are disposed in such a way as to not coincide with each other as seen in a plan view, and distance between the battery 30 and the exhaust gas pipe 28 is ensured. For this reason, heat damage to the battery 30 caused by the exhaust gas pipe 28 can be reduced.

Second Embodiment

Next, a vehicle 70 to which a vehicle underbody structure pertaining to a second embodiment has been applied will be described on the basis of FIG. 5 and FIG. 6. It will be noted that parts that are the same as those in the first embodiment are assigned the same reference signs, and detailed description (also including shared action) will be appropriately omitted. The vehicle 70 pertaining to the second embodiment differs from the vehicle 10 pertaining to the first embodiment in that it is a fuel cell vehicle, and hydrogen tanks 72 are mounted to the vehicle underbody.

As shown in these drawings, the vehicle 70 has, as a drive source, the traveling motor 24 in the drive unit 20 provided in the vehicle front portion. The traveling motor 24 is driven by optimally separately using electric power supplied from two energy sources, a fuel cell (FC) stack 74 and a battery 76.

Specifically, electric energy and water are produced by a chemical reaction between oxygen and hydrogen taken into the FC stack 74. Then, electric power is supplied from the FC stack 74 to the traveling motor 24, and the traveling motor 24 is driven. It will be noted that some of the electric energy produced by the FC stack 74 is stored in the battery 76, so that it is also possible to supply electric power to the traveling motor 24 from the battery 76 by separate use of the FC stack 74 and the battery 76. Furthermore, supply of the hydrogen to the FC stack 74 is performed from the hydrogen tanks 72, which are mounted to the lower side of the floor panel 18. It will be noted that the hydrogen tanks 72 correspond to a "fuel tank" of the disclosure.

Figure 6:
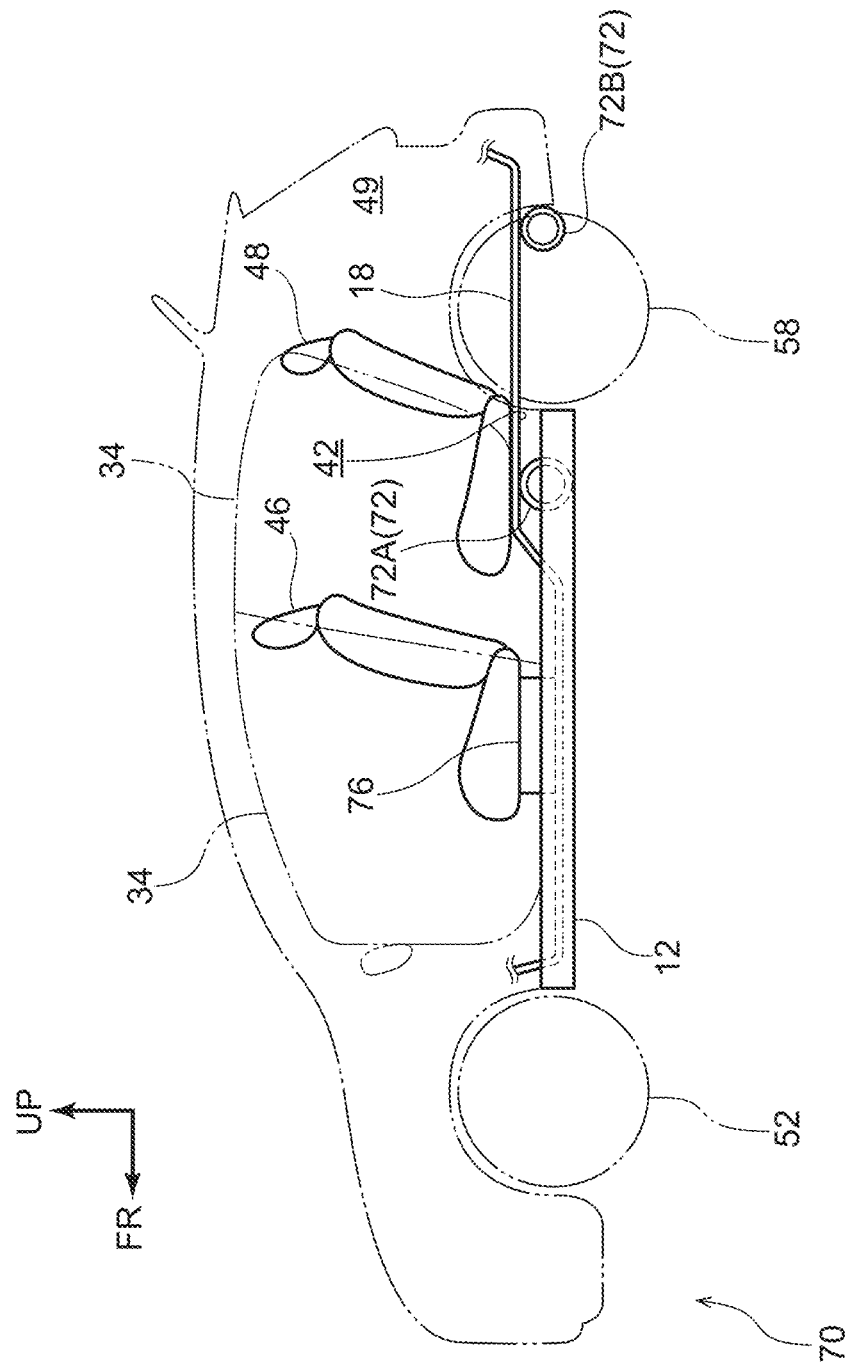
FIG. 6 is a schematic side view, corresponding to FIG. 2, schematically showing the vehicle shown in FIG. 5 as seen from the side.

As shown in FIG. 6, the battery 76 is disposed on the vehicle upper side of the front portion of the floor panel 18 as in the first embodiment. The battery 76 is disposed on the vehicle lower side of the driver's seat 44 and the front passenger seat 46. In the present embodiment, two hydrogen tanks 72 are mounted in two places on the vehicle rear side of the battery 76. The hydrogen tanks 72 are configured by a first hydrogen tank 72A disposed on the vehicle front side and a second hydrogen tank 72B disposed on the vehicle rear side of the first hydrogen tank 72A. The first hydrogen tank 72A and the second hydrogen tank 72B are each formed in a hollow closed cylinder shape and disposed in such a way that their longitudinal direction coincides with the vehicle width direction.

The first hydrogen tank 72A is disposed on the vehicle lower side of the middle portion of the floor panel 18. The first hydrogen tank 72A is positioned under the rear seat 48 of the vehicle 70 and is installed in such a way as to be accommodated in the space portion 42 formed on the lower side of the floor panel 18. For this reason, the first hydrogen tank 72A is disposed on the vehicle upper side of the rockers 12 as seen in a vehicle side view. The first hydrogen tank 72A is disposed on the vehicle width direction inner side of the pair of side frames 14 of the vehicle 70, and the second member 16B and the third member 16C that configure the cross members 16 are disposed in this order from the vehicle front side on both vehicle front-rear direction sides of the first hydrogen tank 72A. Because of this, the first hydrogen tank 72A is surrounded on four sides by the pair of side frames 14, the second member 16B, and the third member 16C as seen in a plan view. It will be noted that the first hydrogen tank 72A is secured to the second member 16B and the third member 16C via tank bands not shown in the drawings.

The second hydrogen tank 72B is disposed on the vehicle lower side of the rear portion of the floor panel 18. The second hydrogen tank 72B is positioned under the luggage compartment 49 of the vehicle 70 and is disposed on the vehicle width direction inner side of the right and left pair of rear side members 56 as seen in a plan view. Furthermore, the fourth member 16D that configures the cross members 16 is disposed on the front side of the second hydrogen tank 72B, and the bumper reinforcement 54 is disposed on the rear side of the second hydrogen tank 72B. Because of this, the second hydrogen tank 72B is surrounded on four sides by the pair of rear side members 56, the fourth member 16D, and the bumper reinforcement 54 as seen in a plan view. It will be noted that the second hydrogen tank 72B is secured to the rear side members 56 and the fourth member 16D via tank bands not shown in the drawings.

Figure 5:
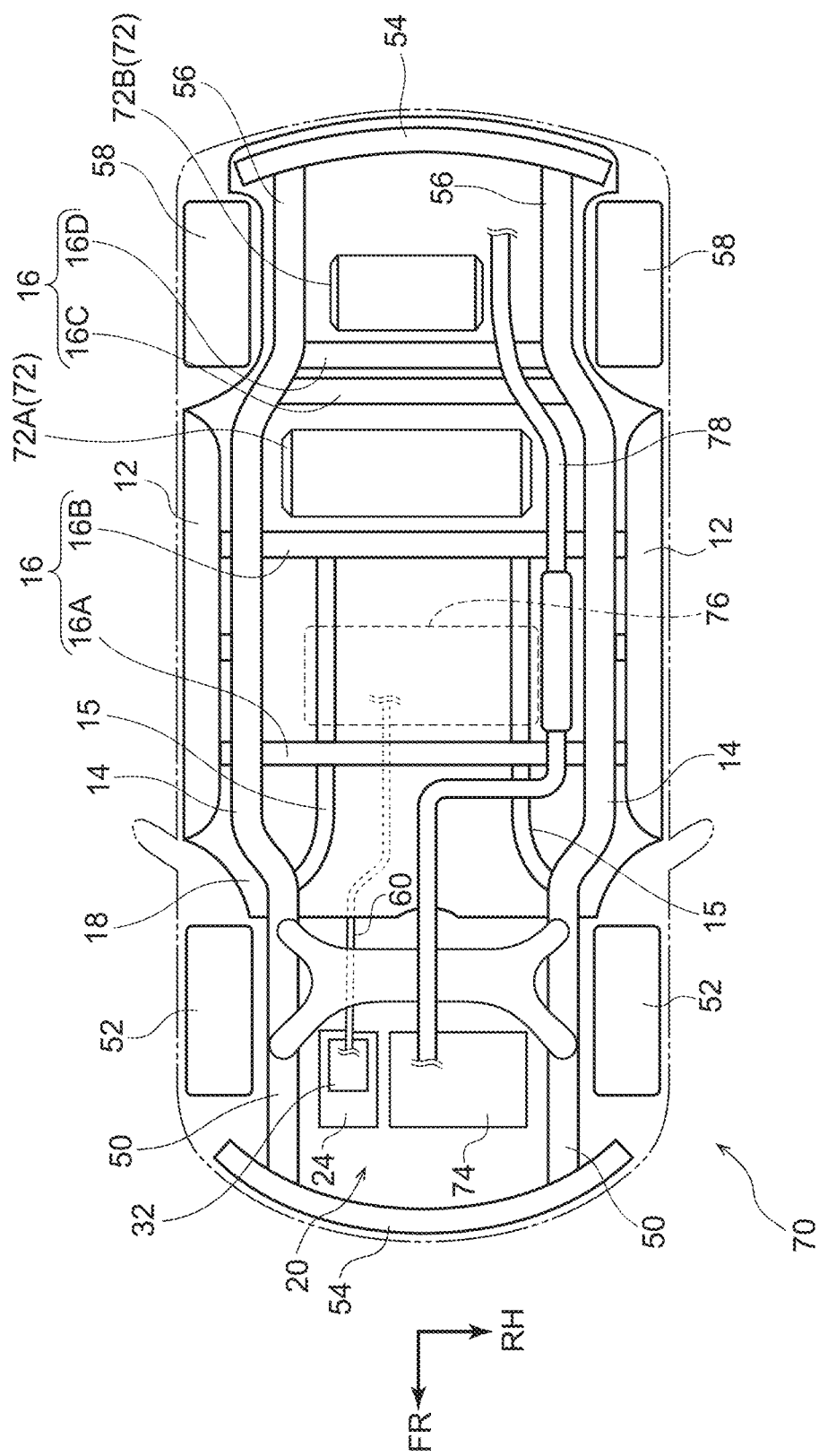
FIG. 5 is a schematic bottom view, corresponding to FIG. 1, schematically showing a vehicle equipped with a vehicle underbody structure pertaining to a second embodiment as seen from above.

As shown in FIG. 5, the FC stack 74 that configures the drive unit 20 is connected to a water discharge pipe 78. The water discharge pipe 78 comprises a cylindrical pipe and has the function of discharging, to the outside of the vehicle, waste water discharged from the FC stack 74. It will be noted that the water discharge pipe 78 corresponds to the "waste pipe" of the disclosure.

The water discharge pipe 78 is disposed on the lower side of the floor panel 18 and extends from the drive unit 20 to the rear end of the vehicle 70. Specifically, the part of the water discharge pipe 78 from its front end portion to its middle portion is disposed in such a way as to extend along the vehicle front-rear direction from the drive unit 20, bend outward in the vehicle width direction on the front side of the battery 76, and cross in front of the battery 76 as seen in a plan view. Then, the water discharge pipe 78 extends in the vehicle rearward direction along the vehicle width direction right side of the battery 76, the first hydrogen tank 72A, and the second hydrogen tank 72B. Furthermore, the water discharge pipe 78 is disposed more inward in the vehicle width direction than the side frame 14 on the vehicle width direction right side of the battery 76, the first hydrogen tank 72A, and the second hydrogen tank 72B. It will be noted that the water discharge pipe 78 may also be disposed between the side frame 14 and the rocker 12 and that the water discharge pipe 78 may also be disposed on the vehicle width direction left side of the battery 76, the first hydrogen tank 72A, and the second hydrogen tank 72B.

(Action and Effects)

Next, the action and effects of the vehicle underbody structure pertaining to the present embodiment will be described.

The configuration of the present embodiment differs from the configuration of the first embodiment in that the hydrogen tanks are mounted instead of the gasoline tank of the first embodiment to the vehicle underbody, but the same action and effects are obtained because it basically follows the configuration of the first embodiment.

Furthermore, in the present embodiment, the four sides of the first hydrogen tank 72A are surrounded by the pair of side frames 14, the second member 16B, and the third member 16C as seen in a plan view, so the first hydrogen tank 72A can be protected from the load input to the vehicle body at the time of an impact to the vehicle.

Furthermore, in the present embodiment, the four sides of the second hydrogen tank 72B are surrounded by the pair of rear side members 56, the fourth member 16D, and the bumper reinforcement 54 as seen in a plan view, so the second hydrogen tank 72B can be protected from the load input to the vehicle body at the time of an impact to the vehicle.

Supplement to the Embodiments

It will be noted that the disclosure is not limited to the above embodiments.

For example, in the first embodiment, the battery 30 is disposed on the lower side of the driver's seat 44 and the front passenger seat 46 on the vehicle upper side of the floor panel 18, but the disclosure is not limited to this. The battery 30 may also be disposed on the lower side of either one of the driver's seat 44 or the front passenger seat 46. Alternatively, the battery 30 is not limited to being disposed on the lower side of the driver's seat 44 and the front passenger seat 46 and may also be disposed on the front side of the driver's seat and the front passenger seat (at the feet of the driver and the front passenger) on the upper side of the floor panel.

Furthermore, in the first embodiment, the battery 30 is disposed on the lower side of the driver's seat 44 and the front passenger seat 46, and the gasoline tank 26 is disposed on the lower side of the rear seat 48, but the disclosure is not limited to this. The battery may also be disposed on the upper side of the floor panel and on the lower side of the rear seat, and the gasoline tank may also be disposed on the lower side of the floor panel and on the lower side of the luggage compartment 49.

Furthermore, in the second embodiment, two hydrogen tanks 72 are mounted to the underbody of the vehicle 70, but the disclosure is not limited to this, and the number of hydrogen tanks mounted to the vehicle may also be one or may also be three or more.

Furthermore, in the second embodiment, the battery 76 is disposed on the lower side of the driver's seat 44 and the front passenger seat 46 on the vehicle upper side of the floor panel 18, but the disclosure is not limited to this. The battery 76 may also be mounted to the lower side of the rear seat of the vehicle, with one hydrogen tank being mounted to the lower side of the luggage compartment 49 of the vehicle.

What is claimed is:

1. A vehicle underbody structure, comprising:
   a pair of rockers that are provided at both vehicle width direction sides of a vehicle underbody and extend in a vehicle front-rear direction;
   a battery that is disposed centrally in a vehicle width direction between the pair of rockers, is disposed above a vehicle floor and at a lower side of a seat, and is in a recess portion in an upper surface of a floor panel;
   a fuel tank that is disposed centrally in the vehicle width direction between the pair of rockers, and is disposed under the vehicle floor and further toward a rear side of the vehicle than the battery;
   a waste pipe that is coupled to a drive unit provided at a vehicle front side of the battery and extends in the vehicle front-rear direction between the battery and one of the rockers, wherein the drive unit includes an inverter, the inverter is outside of the recess portion, and the inverter is forward of the battery in the vehicle front-rear direction; and a high-voltage cable coupling the inverter and the battery.

2. The vehicle underbody structure according to claim 1, wherein the battery and the fuel tank are disposed at positions that overlap with the rockers as seen in a vehicle side view.

3. The vehicle underbody structure according to claim 1, further comprising:
    a pair of first frame members that are respectively disposed between one or another of the pair of rockers and the battery and extend in the vehicle front-rear direction and
    second frame members that couple the first frame members to each other in the vehicle width direction and are respectively disposed at least between the battery and the drive unit and between the battery and the fuel tank as seen in a vehicle plan view.

4. The vehicle underbody structure according to claim 3, wherein:
    the second frame members are disposed at the vehicle front side and the vehicle rear side of the fuel tank, and
    the fuel tank is surrounded on four sides by the pair of first frame members and the second frame members, as seen in a plan view.

5. The vehicle underbody structure according to claim 3, wherein:
    a pair of front side members that extend in the vehicle front-rear direction are provided at front end portions of the pair of first frame members,
    a pair of rear side members that extend in the vehicle front-rear direction are provided at rear end portions of the pair of first frame members, and
    each of the pair of first frame members is offset outward in the vehicle width direction from the front side members and the rear side members, as seen in a plan view.

6. The vehicle underbody structure according to claim 3, wherein the waste pipe is disposed further inward in the vehicle width direction than the first frame members.

7. The vehicle underbody structure according to claim 1, wherein the battery is disposed at a lower side of at least one of a driver's seat or a front passenger seat.

8. The vehicle underbody structure according to claim 1, wherein:
    the waste pipe is disposed at a vehicle lower side of the floor panel.

9. The vehicle underbody structure according to claim 1, wherein:
    the fuel tank is a gasoline tank,
    the drive unit is configured to include a gasoline engine, and
    the waste pipe is an exhaust gas pipe that discharges, to outside of the vehicle, exhaust gas from the gasoline engine.

10. The vehicle underbody structure according to claim 1, wherein:
    the fuel tank is a hydrogen tank,
    the drive unit is configured to include a fuel cell stack, and
    the waste pipe is a water discharge pipe that discharges, to outside of the vehicle, waste water from the fuel cell stack.

* * * * *